US009807179B2

(12) United States Patent
Ye et al.

(10) Patent No.: US 9,807,179 B2
(45) Date of Patent: Oct. 31, 2017

(54) METHOD FOR IMPLEMENTING SESSION BORDER CONTROLLER POOL, AND SESSION BORDER CONTROLLER

(71) Applicant: Huawei Technologies Co., Ltd., Shenzhen (CN)

(72) Inventors: Sihai Ye, Shenzhen (CN); Qinghua Yu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 450 days.

(21) Appl. No.: 14/285,946

(22) Filed: May 23, 2014

(65) Prior Publication Data
US 2014/0258551 A1    Sep. 11, 2014

Related U.S. Application Data

(63) Continuation of application No. PCT/CN2011/082718, filed on Nov. 23, 2011.

(51) Int. Cl.
| | |
|---|---|
| H04L 29/08 | (2006.01) |
| H04L 29/14 | (2006.01) |
| H04L 29/06 | (2006.01) |

(52) U.S. Cl.
CPC .......... *H04L 67/142* (2013.01); *H04L 67/14* (2013.01); *H04L 69/40* (2013.01); *H04L 65/1013* (2013.01); *H04L 67/1002* (2013.01)

(58) Field of Classification Search
CPC . H04L 29/06–29/12783; H04L 45/00–45/021; H04L 65/10–65/1073;
(Continued)

(56) References Cited

U.S. PATENT DOCUMENTS

2008/0080532 A1*  4/2008  O'Sullivan ........... H04L 29/125
                                                                 370/401
2009/0086715 A1*  4/2009  Zhang .................... H04L 45/00
                                                                 370/352
(Continued)

FOREIGN PATENT DOCUMENTS

| CN | 101056269 A | 10/2007 |
|---|---|---|
| CN | 101360057 A | 2/2009 |

(Continued)

OTHER PUBLICATIONS

Foreign Communication From a Counterpart Application, European Application No. 11867502.4, Extended European Search Report dated Oct. 7, 2014, 8 pages.

(Continued)

*Primary Examiner* — Quang N Nguyen
*Assistant Examiner* — Raji Krishnan
(74) *Attorney, Agent, or Firm* — Conley Rose P.C.

(57) ABSTRACT

A method for implementing a session border controller (SBC) pool and a SBC device are provided. In the present invention, an SBC pool is formed by at least two SBCs, the at least two SBCs are mutually backed up for disaster recovery and use a same Internet Protocol (IP) address for a terminal device, and whether the terminal device is registered in the SBC pool is determined; and if the terminal device has been registered in the SBC pool, a service message is forwarded to an SBC with which the terminal device is registered. In this way, it is avoided that SBC device disaster recovery places a special requirement for the terminal device, and the terminal device does not need to be configured with two IP addresses. Furthermore, all devices in the SBC pool can process the service message of the terminal device, thereby increasing a resource utilization rate.

10 Claims, 12 Drawing Sheets

(58) Field of Classification Search
CPC . H04L 67/14–67/26; H04L 67/1002–67/1097; H04L 29/1233–29/12528; H04L 29/125; H04L 12/185–12/1895
See application file for complete search history.

(56) References Cited

U.S. PATENT DOCUMENTS

| | | | | |
|---|---|---|---|---|
| 2009/0144444 | A1* | 6/2009 | Chauffour | H04L 29/06 709/238 |
| 2009/0298521 | A1* | 12/2009 | Finlayson | H04L 12/185 455/500 |
| 2010/0034079 | A1* | 2/2010 | Boucadair | H04L 29/06027 370/218 |
| 2011/0026516 | A1* | 2/2011 | Roberts | H04M 1/2535 370/352 |
| 2012/0036215 | A1* | 2/2012 | Perryman | H04L 47/125 709/217 |
| 2012/0113796 | A1* | 5/2012 | Qiu | H04L 65/1073 370/216 |
| 2013/0117382 | A1* | 5/2013 | Gaddam | H04L 67/26 709/206 |

FOREIGN PATENT DOCUMENTS

| | | |
|---|---|---|
| CN | 101998516 A | 3/2011 |
| EP | 1816887 A1 | 8/2007 |
| WO | 2010068948 A2 | 6/2010 |
| WO | 2011023014 A1 | 3/2011 |

OTHER PUBLICATIONS

Partial English Translation and Abstract of Chinese Patent Application No. CN101056269, Jul. 7, 2014, 17 pages.
Foreign Communication From a Counterpart Application, Chinese Application No. 201180002443.9, Chinese Search Report dated Jan. 7, 2014, 2 pages.
Foreign Communication From a Counterpart Application, Chinese Application No. 201180002443.9, Chinese Office Action dated Jan. 15, 2014, 5 pages.
Foreign Communication From a Counterpart Application, Chinese Application No. 201180002443.9, Chinese Search Report dated May 28, 2013, 2 pages.
Foreign Communication From a Counterpart Application, Chinese Application No. 201180002443.9, Chinese Office Action dated Jun. 5, 2013, 4 pages.
Knight, S., et al., "Virtual Router Redundancy Protocol," RFC 2338, Apr. 1998, 25 pages.
Foreign Communication From a Counterpart Application, PCT Application No. PCT/CN2011/082718, English Translation of International Search Report dated Aug. 30, 2012, 3 pages.
Foreign Communication From a Counterpart Application, PCT Application No. PCT/CN2011/082718, English Translation of Written Opinion dated Aug. 30, 2012, 8 pages.
Foreign Communication From a Counterpart Application, European Application No. 17161743.4, Extended European Sear Report dated May 10, 2017, 8 pages.

* cited by examiner

METHOD FOR IMPLEMENTING SESSION BORDER CONTROLLER POOL, AND SESSION BORDER CONTROLLER

CROSS-REFERENCE TO RELATED APPLICATION

This application is a continuation of International Application No. PCT/CN2011/082718, filed on Nov. 23, 2011, which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to network communications technologies, and in particular, to a method for implementing a session border controller (SBC) pool, and a SBC.

BACKGROUND

To avoid service interruption, backup devices generally are provided for some key service processing devices in a network. In addition, to meet network reliability requirements, a backup device generally needs to be deployed in a remote area. Therefore, a network has a requirement for a remote disaster recovery solution for devices therein.

In the prior art, SBCs generally provide services in an active/standby mode, and two different Internet Protocol (IP) addresses are provided for an active SBC device and a standby SBC device respectively. A peer device, for example, a terminal device or a softswitch at network-side, is configured with IP addresses of the active and standby SBC devices, and determines, by separately probing the two IP addresses, whether the active and standby SBC devices are working normally.

In a normal case, the peer device accesses the IP address of the active SBC device, and implements a related service by using the active SBC device; when perceiving that the active SBC device is faulty, the peer device switches to the standby SBC device automatically to continue the related service, so as to implement SBC device disaster recovery. Such an SBC disaster recovery solution has a special requirement for the peer device (for example, a terminal device), that is, the peer device needs to be configured with two IP addresses. In a normal situation, one of the two devices is selected as an active device, and after it is detected that the active device is abnormal, the peer device automatically switches to a backup device. In addition, the backup device is usually in an idle state, and is used only when the active device is faulty, which causes a low resource utilization rate.

SUMMARY

Embodiments of the present invention provide a method for implementing a SBC pool, and a SBC, so as to avoid disaster recovery of SBCs from placing a special requirement for a terminal device, and increase a resource utilization rate.

An embodiment of the present invention provides a method for implementing a SBC pool, including: receiving, by a SBC in the SBC pool, a service message of a terminal device, and determining whether the terminal device is registered in the SBC pool, where the SBC pool includes at least two SBCs, and the SBCs in the SBC pool communicate with the terminal device by using a same IP address; and forwarding the service message to a SBC with which the terminal device is registered if the terminal device has been registered in the SBC pool, so that the SBC with which the terminal device is registered processes the service message.

An embodiment of the present invention further provides a SBC, where the SBC is located in a SBC pool, the SBC pool includes the SBC and one or more other SBCs, and the SBC and the one or more other SBCs communicate with a terminal device by using a same IP address; the SBC includes a receiving unit and a forwarding unit; where the receiving unit is configured to receive a service message of the terminal device, and determine whether the terminal device is registered in the SBC pool; and the forwarding unit is configured to forward the service message to a SBC with which the terminal device is registered when the receiving unit determines that the terminal device has been registered in the SBC pool, so that the SBC with which the terminal device is registered processes the service message.

As can be known from the foregoing technical solutions, in the embodiments of the present invention, a SBC pool is formed by at least two SBCs, the SBCs in the SBC pool communicate with a terminal device by using a same IP address, and if the terminal device has been registered in the SBC pool, a service message is forwarded to a SBC with which the terminal device is registered, so that the SBC with which the terminal device is registered processes the service message. In this way, it is avoided that disaster recovery of SBC devices places a special requirement for the terminal device, and the terminal device does not need to be configured with two IP addresses. In addition, all devices in the SBC pool can process the service message of the terminal device, thereby increasing a resource utilization rate.

BRIEF DESCRIPTION OF THE DRAWINGS

To describe the technical solutions in the embodiments of the present invention more clearly, the following briefly introduces the accompanying drawings required for describing the embodiments. The accompanying drawings in the following description show some embodiments of the present invention, and persons of ordinary skill in the art may still derive other drawings from these accompanying drawings without creative efforts.

FIG. 1 is a schematic flowchart of a method for implementing a SBC pool according to an embodiment of the present invention;

FIG. 2 is a first schematic structural diagram of a specific application scenario of a SBC pool according to an embodiment of the present invention;

FIG. 3 is a second schematic structural diagram of a specific application scenario of a SBC pool according to an embodiment of the present invention;

FIG. 4 is a third schematic structural diagram of a specific application scenario of a SBC pool according to an embodiment of the present invention;

FIG. 5 is a flowchart of a specific implementation of a method for implementing a SBC pool according to an embodiment of the present invention;

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. The described embodiments are a part rather than all of the embodiments of the present invention. All other embodiments obtained by persons of ordinary skill in the art based on the embodiments of the present invention without creative efforts shall fall within the protection scope of the present invention.

Figure 1:
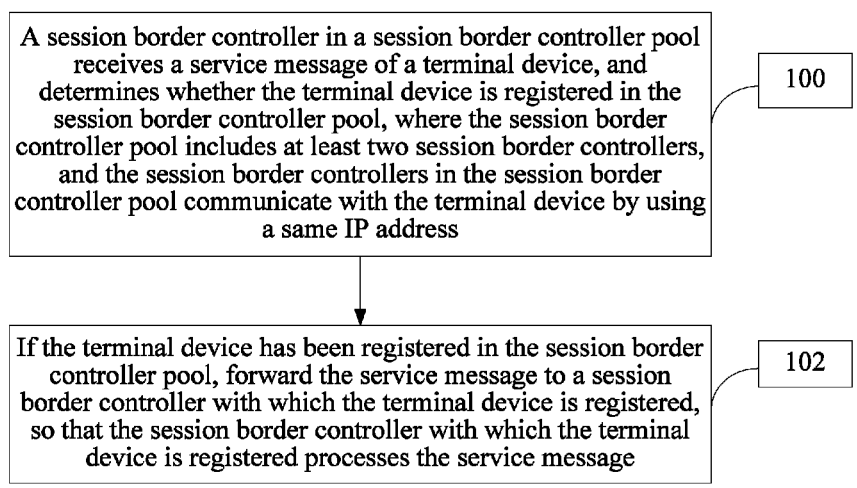

FIG. 1 is a schematic flowchart of a method for implementing a SBC pool according to an embodiment of the present invention, and the method includes the following steps:

Step 100: A SBC in the SBC pool receives a service message of a terminal device, and determines whether the terminal device is registered in the SBC pool, where the SBC pool includes at least two SBCs, and the SBCs in the SBC pool communicate with the terminal device by using a same IP address.

Step 102: If the terminal device has been registered in the SBC pool, forward the service message to a SBC with which the terminal device is registered, so that the SBC with which the terminal device is registered processes the service message.

The service message of the terminal device may be a service message, such as a registration request message, a calling request message, or a called request message, of the terminal device. SBC devices in the SBC pool may have different IP addresses in the SBC pool, where the IP addresses are used to distinguish different SBC devices in the SBC pool, so that the SBC devices in the SBC pool can be notified and managed.

The at least two SBCs may be disaster-recovery controllers for each other, where the disaster recovery for each other is that the at least two SBCs are mutually backed up for disaster recovery. Disaster-recovery SBC devices can ensure that a service of the terminal device is not interrupted when an SBC device is faulty. If an SBC device is faulty, another SBC device can replace the faulty SBC device to continue to process the service of the terminal device.

In the method, the SBC pool is formed by at least two SBCs, the SBCs communicate with the terminal device by using a same IP address, and when the service message of the terminal device is received, whether the terminal device is registered in the SBC pool is determined; and if the terminal device has been registered in the SBC pool, the service message is forwarded to the SBC with which the terminal device is registered, so that the SBC with which the terminal device is registered processes the service message. In this way, it is avoided that disaster recovery of SBC devices places a special requirement for the terminal device, and the terminal device does not need to be configured with two IP addresses. In addition, all devices in the SBC pool can process the service message of the terminal device, thereby increasing a resource utilization rate.

Optionally, if the terminal device is not registered in the SBC pool, the SBC receiving the service message of the terminal device distributes the service message to any one SBC in the SBC pool for registration. Further, after the SBC receiving the service message of the terminal device distributes the service message to the any one SBC in the SBC pool for registration, registration information of the terminal device is sent to another SBC in the SBC pool, so that the another SBC records information of the SBC with which the terminal device is registered.

Optionally, if the service message received from the terminal device includes a registration request message and the terminal device is not registered in the SBC pool, the SBC receiving the service message of the terminal device distributes the service message to any one SBC in the SBC pool for registration. If the service message received from the terminal device includes a calling request message or a called request message and the terminal device is not registered, the SBC receiving the service message of the terminal device may reject this service request of the terminal device, and certainly, may also distribute the service message to any one SBC in the SBC pool for registration, which is not limited in the embodiment of the present invention.

The terminal device is registered with any one SBC in the SBC pool, which can register an unregistered terminal device in the SBC pool, and implement disaster recovery backup between SBCs in the SBC pool, so that when a SBC is faulty, the terminal device may also be registered with another SBC. In addition, the registration information of the terminal device is sent to another SBC in the SBC pool, so that the another SBC in the SBC pool can know whether the terminal device is registered in the SBC pool and the SBC with which the terminal device is registered. When receiving a service message, for example, a calling request message, of the terminal device, the another SBC can forward the service message of the terminal device to the SBC with which the terminal device is registered for processing.

Optionally, SBCs included in the SBC pool communicate with a network-side device by using a same IP address; and when receiving another service message of the network-side device about the terminal device, a SBC in the SBC pool determines the SBC with which the terminal device is registered, and forwards the another service message to the SBC with which the terminal device is registered, so that the SBC with which the terminal device is registered processes the another service message.

The network-side device may be a network control device or another device with a control function, for example, a control device such as a media gateway controller (MGC) or a softswitch.

The at least two SBCs communicate with the network-side device by using the same IP address, which can further reduce modifications by the SBC pool to a network, and no special requirement is placed on a network side, so that an implementation manner of the SBC pool can be implemented more easily in an existing network, which can improve the network management quality and efficiency while reducing the maintenance cost.

Optionally, the determining whether the terminal device is registered in the SBC pool in step 100 includes: querying a registration list that is stored by the SBC receiving the service message of the terminal device and determining whether the registration information of the terminal device is included in the registration list, and if the registration information of the terminal device is not included in the registration list, determining that the terminal device is not registered in the SBC pool, where the registration list records registration information, which is recorded by a SBC in the SBC pool, of the terminal device registered in the SBC pool.

Optionally, after the distributing, by the SBC receiving the service message of the terminal device, the service message to any one SBC in the SBC pool for registration in step 102, the method further includes: registering, by the SBC receiving the service message of the terminal device, the terminal device with another SBC, where the another SBC is a backup device of the any one SBC, and when the any one SBC is faulty, the another SBC processes the service of the terminal device.

Optionally, the distributing, by the SBC receiving the service message of the terminal device, the service message to any one SBC in the SBC pool for registration in step 102 includes: distributing, by means of round-robin, random selection, or load balancing, by the SBC receiving the service message of the terminal device, the service message to any one SBC in the SBC pool for registration; or distributing, by the SBC receiving the service message of the terminal device, the service message to a SBC whose physical address is closest to a physical address of the terminal device for registration.

The foregoing manner can further ensure balance of registration of the terminal device in the SBC pool, and ensure load balancing among devices in the SBC pool.

Figure 2:
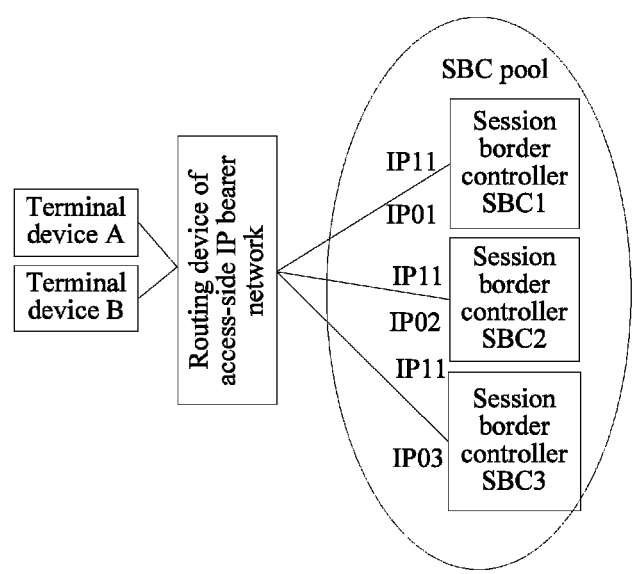

In the following, a specific implementation manner of the embodiment of the present invention is described in detail by using an example in which an SBC pool includes 3 SBC devices. FIG. 2 is a structural diagram of the SBC pool. The 3 SBC devices are disaster recovery devices of each other and have a same IP address for a terminal device. The foregoing 3 SBC devices are merely a simple example, and are used for describing and interpreting the specific implementation manner of the embodiment of the present invention. During specific implementation, the SBC pool and SBC devices therein applied in the embodiment of the present invention may have multiple implementation manners, for example, more than 3 SBC devices exist. No specific limitation is imposed on the SBC devices in the SBC pool in the embodiment of the present invention, and for an implementation manner of another SBC pool having more than 3 SBC devices, reference may be made to the implementation manner of the 3 SBC devices in the following.

Referring to FIG. 2, the SBCs in the SBC pool are configured with a same IP address (for example, IP11) for a terminal device, that is, the SBCs communicate with the terminal device by using the same IP address. In addition, the SBCs may have different IP addresses (such as IP01, IP02, and IP03) and are connected to a routing device of an access-side IP bearer network. An IP address (IP11) is configured on the terminal device, a service message of the terminal device may be sent to any one device in the SBC pool, and the SBC devices in the SBC pool all are in a working state. In this way, only one IP address (for example, IP11) needs to be configured on the terminal device, and a networking scheme has no special requirement on the terminal. The devices in the SBC pool are provided with different IP addresses (IP01, IP02, and IP03), the routing device is connected by using these IP addresses, and no special requirement is placed on the routing device.

Figure 3:
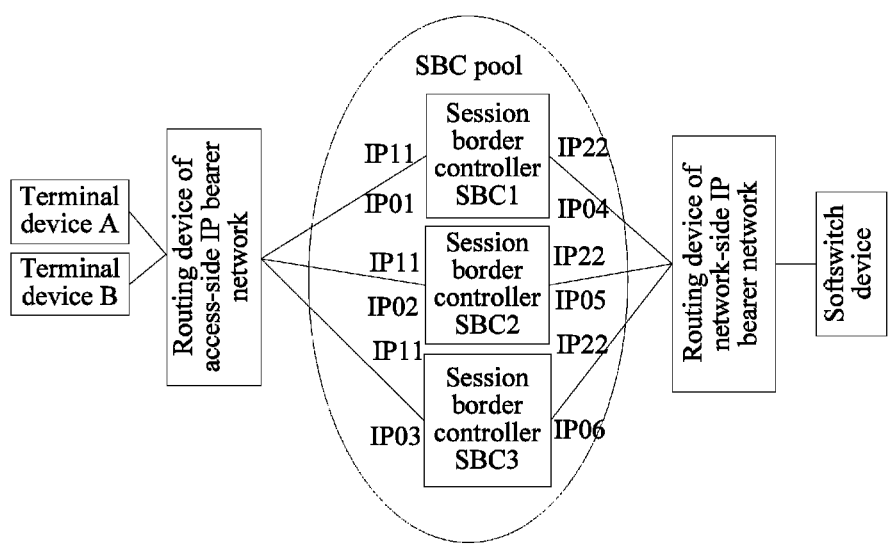

In the implementation manner shown in FIG. 2, only a networking mode used at a terminal device side is described. For a networking mode used at a network side, two scenarios may be used, and the objectives of the embodiment of the present invention can be achieved in both the two scenarios:

Scenario 1: Devices in an SBC pool use a same IP address for a network side, that is, the SBCs in the SBC pool communicate with a network-side device by using the same IP address, as shown in FIG. 3; the devices in the SBC pool also use a same IP address (for example, IP22) for the network side, and meanwhile, the SBC devices are separately connected to a routing device of a network-side IP bearer network by using different IP addresses (such as IP04, IP05, and IP06); and certainly, may also be connected to the routing device of the network-side IP bearer network by using IP01, IP02, and IP03, which is not specifically limited in the embodiment of the present invention. The network-side device, such as a softswitch device, is connected to the SBCs in the SBC pool by using an IP address (for example, IP22). Optionally, the IP address for the network side may also be the same as the IP address for the terminal device side, that is, IP22 may be replaced by IP11. In the embodiment of the present invention, IP11 and IP22 are used as an example for description. When the terminal device is registered, a same IP address (IP22) is used on the network-side softswitch device.

Figure 4:
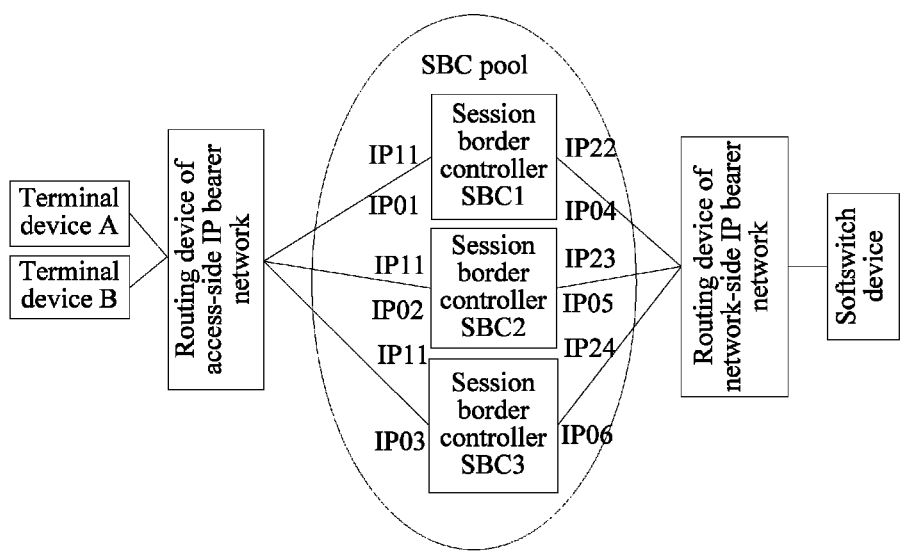

Scenario 2: Devices in an SBC pool use different IP addresses for a network side, that is, the SBCs in the SBC pool communicate with a network-side device by using the different IP addresses, as shown in FIG. 4; the devices in the SBC pool use different IP addresses (for example, IP22, IP23, and IP24) for the network side. The network-side device, for example, a softswitch device, is connected to each SBC device by using a different IP address. When a terminal device is registered, if registration is performed on different SBC devices, different IP addresses are used. For example, if registration is performed on an SBC1, IP22 is used; if registration is performed on an SBC2, IP23 is used; and if registration is performed on an SBC3, IP24 is used.

The following describes specific implementation manners of the SBC pool in different scenarios.

Figure 5:
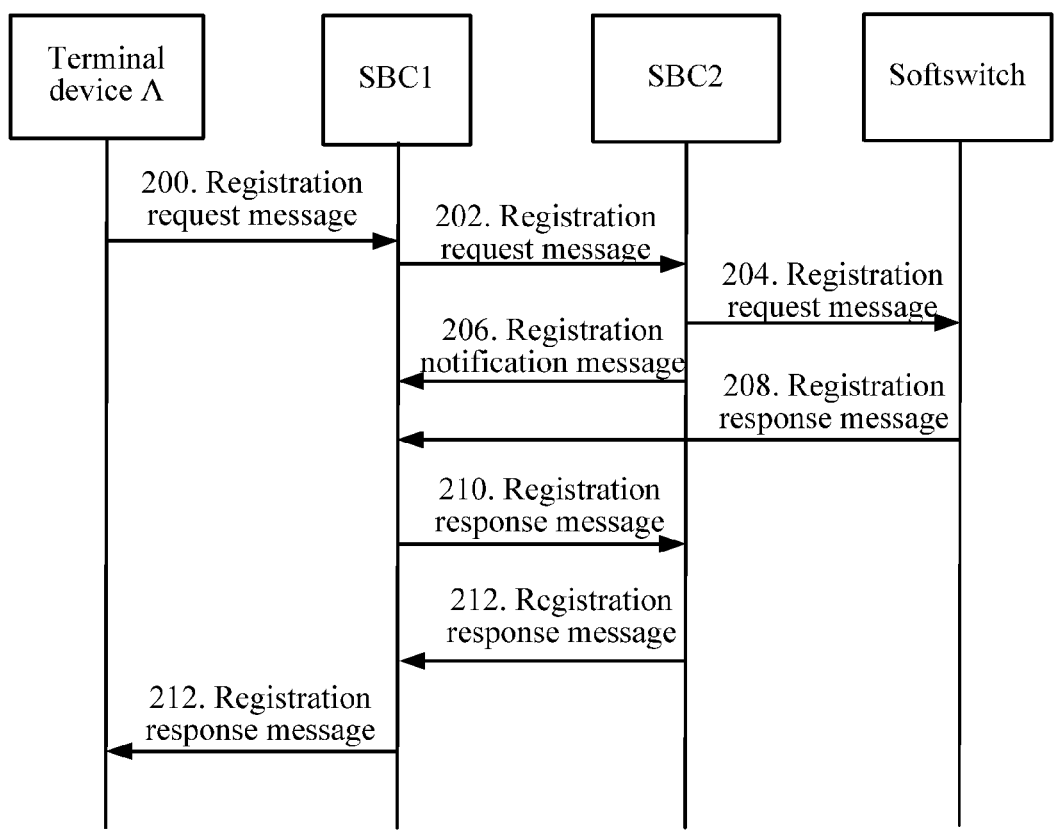

Referring to FIG. 5, FIG. 5 is a flowchart of a specific implementation of a method for implementing a SBC pool according to an embodiment of the present invention. With reference to FIG. 3, this embodiment is described by using an example in which in Scenario 1, a terminal device is registered in the SBC pool for the first time, including:

Step 200: A terminal device A initiates a registration request message, whose destination address is the SBC pool.

Because SBC devices in the SBC pool have a same IP address for a terminal device, the destination address of the terminal device A is IP11.

After the terminal device A initiates the registration request message, according to a specific routing rule, any one SBC in the SBC pool may receive the registration request message of the terminal device A; and the embodiment of the present invention is described by using an example in which the registration request message is sent to an SBC1.

Step 202: After receiving the registration request message whose destination address is IP11, the SBC1 determines whether the terminal device A has been registered in the SBC pool. That is, the SBC1 determines whether the terminal device A is registered for the first time; and if the terminal device A is registered for the first time, the SBC1 forwards the registration request message to any one SBC device in the SBC pool according to a preset distribution algorithm, so that the any one SBC device can process the registration request message of the terminal device A. The embodiment of the present invention is described by using an example in which the registration request message is forwarded to an SBC2.

The foregoing distribution algorithm may be a manner of round-robin, random selection, or load balancing, and the registration request message is distributed to any one SBC device in the SBC pool by means of the algorithm. The registration request message may also be distributed to an SBC device whose physical address is closest to a physical address of the terminal.

In the embodiment of the present invention, whether the terminal device A is registered for the first time may be determined in the following manner:

After receiving the registration request message of the terminal device A, the SBC1 queries a registration list stored by the SBC1, determines whether the terminal device A is in the registration list. If the terminal device A is not found, the SBC1 determines that the terminal device A is not registered in the SBC pool. The registration list records registration information recorded by a SBC device in the SBC pool after a terminal device is registered, where the registration information is information of that a terminal device is registered with an SBC in the SBC pool. When a terminal device is registered with an SBC device in the SBC pool, the SBC device records registration information of the terminal device in a registration list of the SBC device, and notifies another SBC device in the SBC pool of the registration information of the terminal device, so that the another SBC device records that the terminal device A has been registered with the SBC2. The SBC device may use a registration list stored by the SBC device to record the registration information of the terminal device, where the registration list records the registration information of the terminal device. Different terminal devices may be distinguished by using IP address information.

Step 204: The SBC2 completes registration of the terminal device A with the SBC2, and initiates a registration process to a network-side softswitch device.

Specifically, the destination address received by the SBC2 is IP11, the registration request message is no longer forwarded after being forwarded by the SBC1, and the registration process is executed on the SBC2. The SBC2 completes registration of the terminal device A with the SBC2, and initiates the registration process to the network-side device. A service IP of the SBC2 in the registration request message sent to the softswitch is IP22.

Step 206: The SBC2 notifies another SBC in the SBC pool that the terminal device A has been registered with the SBC2, so that the another SBC in the SBC pool updates a registration list stored by the another SBC, and records that the terminal device A has been registered with the SBC2.

Which SBC needs to be notified by the SBC2 may be determined with reference to routing configuration, and only an SBC that is reachable by routing for the registered terminal needs to be notified. For example, if only the SBC1 and the SBC2 are reachable for a route between the terminal device A and SBCs, the SBC1 needs to be notified; and if the SBC1, the SBC2, and an SBC3 are reachable for a route between the terminal device A and SBCs, the SBC1 and the SBC3 need to be notified. As shown in the accompanying drawing, description is made by using an example in which the SBC1 is notified.

No precedence is fixed between steps 204 and 206, and during a specific implementation process, step 206 may also be performed before step 204.

Step 208: After receiving the registration request message, the softswitch processes the registration request message of the terminal device A, and then returns a registration response message, whose destination address is IP22.

According to specific routing configuration, the registration response message may be sent to any one SBC in the SBC pool, and this embodiment is described by using an example in which the SBC1 receives the registration response message.

Step 210: The SBC1 receives, from the softswitch, the registration response message whose destination address is IP22, and determines that the terminal device A has been registered with the SBC2, and the SBC1 forwards the registration response message to the SBC2.

Step 212: After receiving the registration response message from the softswitch which is forwarded by the SBC1, the SBC2 completes a registration process at the network side, and returns a registration response message to the terminal.

The registration response message returned by the SBC2 to the terminal device A may be forwarded by the SBC1, and may also be sent to terminal device A directly. This embodiment is described by using an example in which the registration response message is forwarded by the SBC1.

Further, if the SBC2 is faulty, to avoid re-registration of the terminal device A, after registration of the terminal device A with the SBC2 is completed, a backup SBC (the SBC1 is used as an example in description of the embodiment of the present invention) may be selected from the SBC pool, and the terminal device A is also registered with the SBC1. After registration with the SBC1 is completed, the SBC1 also needs to notify other SBC in the pool that the SBC1 is the backup SBC with which the terminal device A is registered. In this way, when an SBC device in the SBC pool receives a service message of terminal device A, if the SBC2 is found faulty and cannot forward the message to the SBC2, the SBC device forwards the message to the backup SBC1 for processing.

In the foregoing embodiment, when a SBC in an SBC pool receives a service message from a terminal device, whether the terminal device is registered in the SBC pool is determined; and if the terminal device is not registered in the SBC pool, the SBC receiving the service message of the terminal device distributes the service message to any one SBC in the SBC pool for registration. In this way, all SBC devices in the SBC pool can be in a working state, and are mutually backed up for disaster recovery. In addition, a same IP address is configured for a terminal device side, a same IP address is also configured for a network side, and no special requirement is placed on an existing networking scheme and an existing routing device, so that implementation and popularization are easy.

Figure 6:
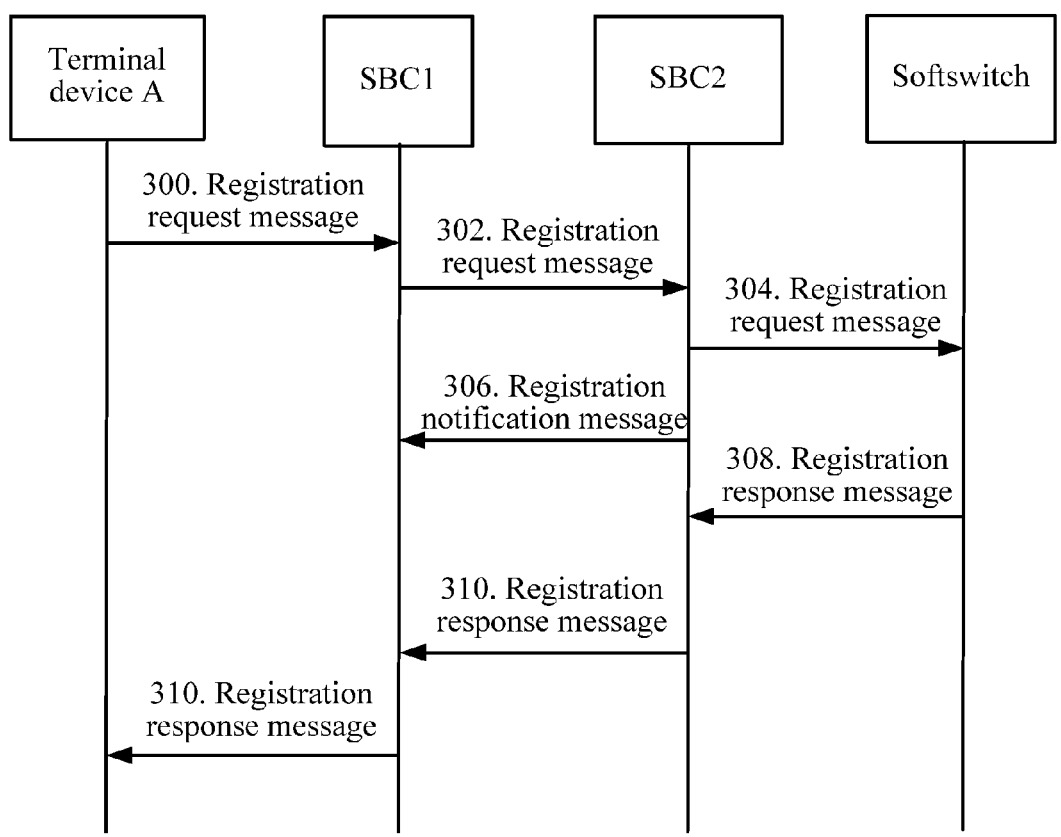
FIG. 6 is another flowchart of a specific implementation of a method for implementing a SBC pool according to an embodiment of the present invention.

Referring to FIG. 6, FIG. 6 is another flowchart of a specific implementation of a method for implementing a SBC pool according to an embodiment of the present invention. With reference to FIG. 4, this embodiment is described by using an example in which in Scenario 2, a terminal device is registered in the SBC pool for the first time, including:

Step 300: A terminal device A initiates a registration request message, whose destination address is the SBC pool.

Because SBC devices in the SBC pool have a same IP address for a terminal device, the destination address of the terminal device A is IP11.

After the terminal device A initiates the registration request message, according to a specific routing rule, any one SBC in the SBC pool may receive the registration request message of the terminal device A; and the embodiment of the present invention is described by using an example in which the registration request message is sent to an SBC1.

Step 302: After receiving the registration request message whose destination address is IP11, the SBC1 determines whether the terminal device A has been registered in the SBC pool. That is, the SBC1 determines whether the terminal device A is registered for the first time; and if the terminal device A is registered for the first time, the SBC1 forwards, according to a preset distribution algorithm, the registration request message to any one SBC device in the SBC pool that can work normally. The embodiment of the present invention is described by using an example in which the registration request message is forwarded to an SBC2.

The foregoing distribution algorithm may be a manner of round-robin, random selection, or load balancing, and the registration request message is distributed to any one SBC device in the SBC pool by means of the algorithm. The registration request message may also be distributed to an SBC device whose physical address is closest to a physical address of the terminal.

In the embodiment of the present invention, whether the terminal device A is registered for the first time may be determined in the following manner:

After receiving the registration request message of the terminal device A, the SBC1 queries a registration list stored by the SBC1, determines whether the terminal device A is in the registration list. If the terminal device A is not found, the SBC1 determines that the terminal device A is not registered in the SBC pool. The registration list records registration information recorded by a SBC device in the SBC pool after a terminal device is registered, where the registration information is information of that a terminal device is registered with an SBC in the SBC pool. When a terminal device is registered with an SBC device in the SBC pool, the SBC device records registration information of the terminal device in a registration list of the SBC device, and notifies another SBC device in the SBC pool of the registration information of the terminal device, where different terminal devices may be distinguished by using IP address information.

Step 304: The SBC2 completes registration of the terminal device A with the SBC2, and initiates a registration process to a network-side softswitch device.

Specifically, the destination address received by the SBC2 is IP11, the registration request message is no longer forwarded after being forwarded by the SBC1, and the registration process is executed on the SBC2. The SBC2 completes registration of the terminal device A with the SBC2, and initiates the registration process to the network-side device. A service IP of the SBC2 in the registration request message sent to the softswitch is IP23.

Step 306: The SBC2 notifies other SBC in the SBC pool that the terminal device A has been registered with the SBC2.

Which SBC needs to be notified by the SBC2 may be determined with reference to routing configuration, and only an SBC that is reachable by routing for the registered terminal needs to be notified. For example, if only the SBC1 and the SBC2 are reachable for a route between the terminal device A and SBCs, the SBC1 needs to be notified; and if the SBC1, the SBC2, and an SBC3 are reachable for a route between the terminal device A and SBCs, the SBC1 and the SBC3 need to be notified. As shown in the accompanying drawing, description is made by using an example in which the SBC1 is notified.

Step 308: After receiving the registration request, the softswitch processes the registration request message of the terminal device A, and then returns a registration response message, whose destination address is IP23.

Step 310: After receiving the registration response message of the softswitch, the SBC2 completes a registration process at the network side, and returns a registration response message to the terminal.

The registration response message returned by the SBC2 to the terminal device A may be forwarded by the SBC1, and may also be sent to terminal device A directly. This embodiment is described by using an example in which the registration response message is forwarded by the SBC1.

Further, if the SBC2 is faulty, to avoid re-registration of the terminal device A, after registration of the terminal device A with the SBC2 is completed, a backup SBC (the SBC1 is used as an example in description of the embodiment of the present invention) may be selected from the SBC pool, and the terminal device A is also registered with the SBC1. After registration with the SBC1 is completed, the SBC1 also needs to notify other SBC in the pool that the SBC1 is the backup SBC with which the terminal device A is registered. In this way, when an SBC device in the SBC pool receives a service message of the terminal device A, if the SBC2 is found faulty and cannot forward the message to the SBC2, the SBC device forwards the message to the backup SBC1 for processing.

In the foregoing embodiment, when a SBC in an SBC pool receives a service message from a terminal device, whether the terminal device is registered in the SBC pool is determined; and if the terminal device is not registered in the SBC pool, the SBC receiving the service message of the terminal device distributes the service message to any one SBC in the SBC pool for registration. In this way, all SBC devices in the SBC pool can be in a working state, and are mutually backed up for disaster recovery. In addition, a same IP address exists on the terminal device, and no special requirement is placed on an existing networking scheme and an existing routing device, so that implementation and popularization are easy.

Figure 7:
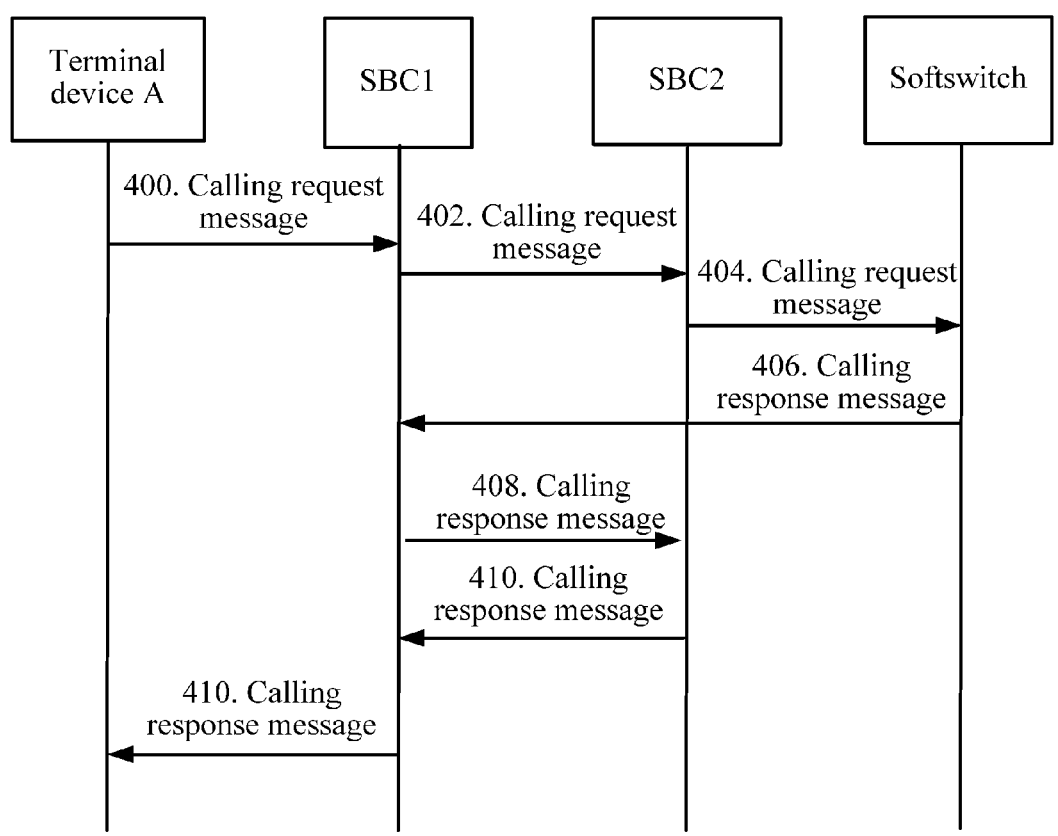
FIG. 7 is another flowchart of a specific implementation of a method for implementing a SBC pool according to an embodiment of the present invention.

Referring to FIG. 7, FIG. 7 is another flowchart of a specific implementation of a method for implementing a SBC pool according to an embodiment of the present invention. With reference to FIG. 3, this embodiment is described by using an example in which in Scenario 1, a terminal device initiates a calling service and the terminal device is registered with an SBC2, including:

Step 400: A terminal device A initiates a calling request message, whose destination address is IP11. According to specific routing configuration on a router of an access-side IP bearer network, the calling request message may be sent to any one SBC in an SBC pool, and this embodiment is described by using an example in which the calling request message is sent to an SBC1.

Step 402: The SBC1 receives the calling request message whose destination address is IP11, and determines that the terminal device A has been registered with the SBC2. The SBC1 forwards the calling request message to the SBC2.

Step 404: The SBC2 processes the calling request message, and sends the calling request message to a softswitch.

Step 406: After receiving the calling request message, the softswitch returns a calling response message, whose destination address is IP22. According to specific configuration of a router of a network-side IP bearer network, the calling response message may be sent to any one SBC in the SBC pool. This embodiment is described by using an example in which the calling response message is sent to the SBC1.

Step 408: The SBC1 receives the calling response message whose destination address is IP22, which is sent from the softswitch, of the terminal device A. The SBC1 determines that the terminal device A has been registered with the SBC2, and forwards the calling response message to the SBC2.

Step 410: The SBC2 returns the calling response message to the terminal.

The calling response message returned by the SBC2 to the terminal device A may be forwarded by the SBC 1, and may also be sent to the terminal device A directly. This embodiment is described by using an example in which the calling response message is forwarded by the SBC1.

Further, if the SBC2 is faulty, it is required to forward the calling request message to a backup SBC with which the terminal device A is registered. If the backup device of the terminal device A is the SBC1, in step 402, the SBC1 processes the calling request message directly, and sends the calling request message to the softswitch. A subsequent execution process thereof is similar to that of the SBC2, and no detail is described herein again. If the backup device of the terminal device A is an SBC3, in step 402, the SBC1 forwards the calling request message to the SBC3 for processing. A subsequent execution process thereof is similar to that of the SBC2, and no detail is described herein again.

In the foregoing embodiment, when an SBC1 in the SBC pool receives a calling request message of a terminal device, the SBC1 determines that the terminal device has been registered with an SBC2, and forwards the calling message to the SBC2, so that the SBC2 processes the calling message. In this way, all SBC devices in the SBC pool can be in a working state, and are mutually backed up for disaster recovery. In addition, a same IP address is configured for a terminal device side, a same IP address is also configured for a network side, and no special requirement is placed on an existing networking scheme and an existing routing device, so that implementation and popularization are easy.

Figure 8:
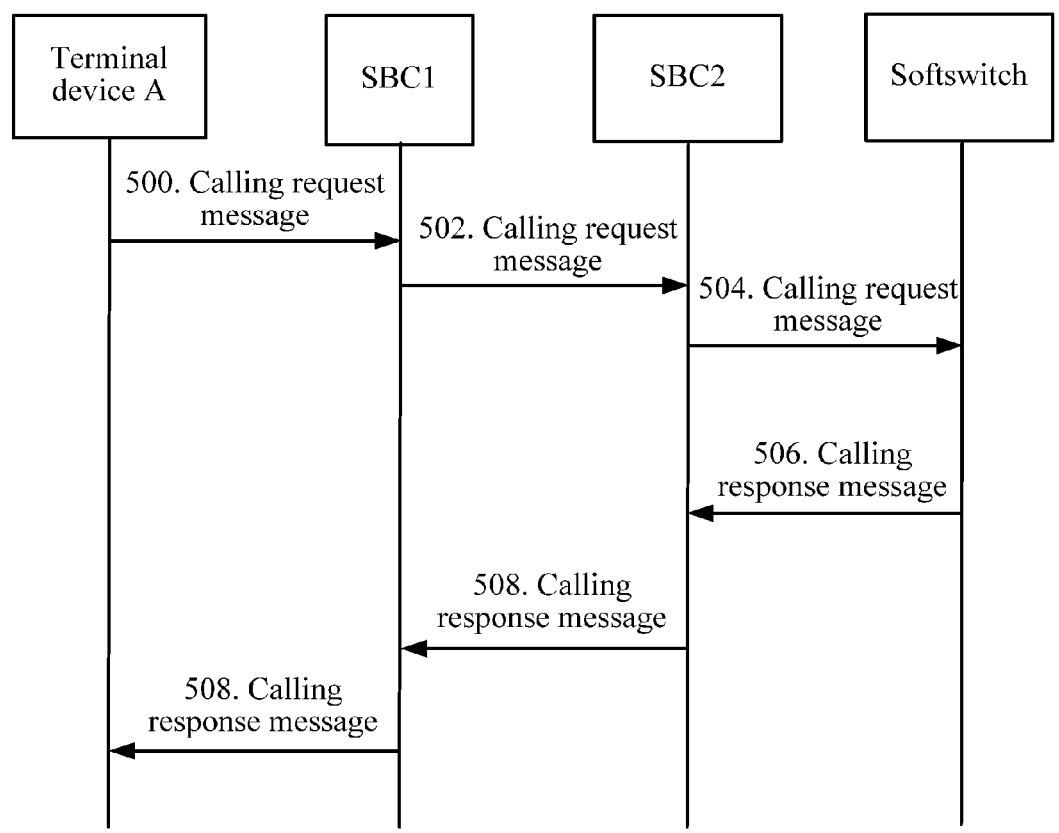
FIG. 8 is another flowchart of a specific implementation of a method for implementing a SBC pool according to an embodiment of the present invention.

Referring to FIG. 8, FIG. 8 is another flowchart of a specific implementation of a method for implementing a SBC pool according to an embodiment of the present invention. With reference to FIG. 4, this embodiment is described by using an example in which in Scenario 2, a terminal device initiates a calling service and the terminal device is registered with an SBC2, including:

Step 500: A terminal device A initiates a calling request message, whose destination address is IP11. According to specific routing configuration on a router of an access-side IP bearer network, the calling request message may be sent to any one SBC in an SBC pool, and this embodiment is described by using an example in which the calling request message is sent to an SBC1.

Step 502: The SBC1 receives the calling request message whose destination address is IP11, and determines that the terminal device A has been registered with the SBC2. The SBC1 forwards the calling request message to the SBC2.

Step 504: The SBC2 processes the call, and sends the calling request message to a softswitch.

Step 506: After receiving the calling request message, the softswitch returns a calling response message, whose destination address is IP23.

Step 508: The SBC2 returns the calling response message to the terminal.

The calling response message returned by the SBC2 to the terminal device A may be forwarded by the SBC1, and may also be sent to the terminal device A directly. This embodiment is described by using an example in which the calling response message is forwarded by the SBC1.

Further, if the SBC2 is faulty, it is required to forward the calling request message to a backup SBC with which the terminal device A is registered. If the backup device of the terminal device A is the SBC1, in step 502, the SBC1 processes the calling request message directly, and sends the calling request message to the softswitch. A subsequent execution process thereof is similar to that of the SBC2, and no detail is described herein again. If the backup device of the terminal device A is an SBC3, in step 502, the SBC1 forwards the calling request message to the SBC3 for processing. A subsequent execution process thereof is similar to that of the SBC2, and no detail is described herein again.

In the foregoing embodiment, when an SBC1 in the SBC pool receives a calling request message of a terminal device, the SBC1 determines that the terminal device has been registered with an SBC2; and if the terminal device is not registered in the SBC pool, the SBC1 forwards the calling message to the SBC2, so that the SBC2 processes the calling message. In this way, all SBC devices in the SBC pool can be in a working state, and are mutually backed up for disaster recovery. In addition, a same IP address is configured for a terminal device side, and no special requirement is placed on an existing networking scheme and an existing routing device, so that implementation and popularization are easy.

Figure 9:
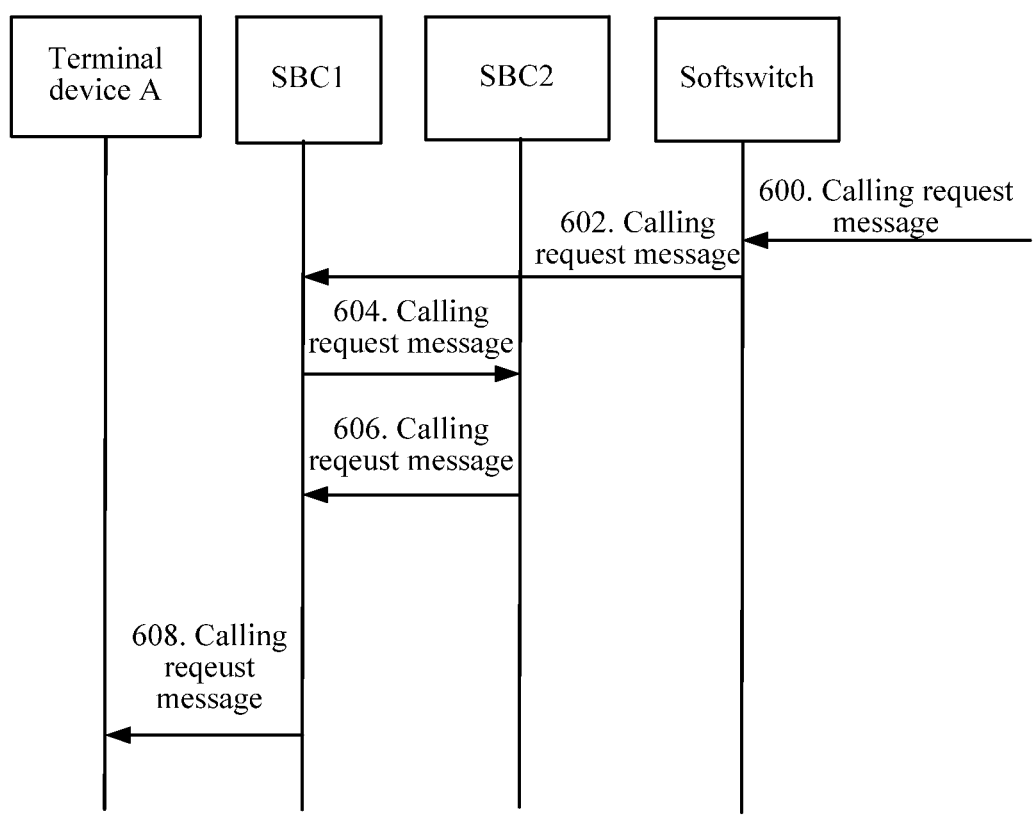
FIG. 9 is another flowchart of a specific implementation of a method for implementing a SBC pool according to an embodiment of the present invention.

Referring to FIG. 9, FIG. 9 is another flowchart of a specific implementation of a method for implementing a SBC pool according to an embodiment of the present invention. With reference to FIG. 3, this embodiment is described by using an example in which in Scenario 1, a terminal device is called and the terminal device is registered with an SBC2, including:

Step 600: Another user initiates a calling request message to a terminal device A, and a softswitch receives the calling request message.

Step 602: After receiving the calling request message, the softswitch delivers the calling request message of the terminal device A to an SBC pool, where a destination address of the calling request message is IP22. According to configuration on a router of a network-side IP bearer network, the calling request message for the terminal device A may be sent to any one SBC in the SBC pool, and this embodiment is described by using an example in which the calling request message is sent to an SBC1.

Step 604: The SBC1 receives the calling request message whose destination address is IP22, and determines that the terminal device A has been registered with an SBC2. The SBC1 forwards the calling request message to the SBC2.

Step 606: The SBC2 processes the calling request message, and sends the calling request message to terminal device A.

The calling request message sent by the SBC2 to the terminal device A may be forwarded by the SBC1, and may also be sent to the terminal device A directly. This embodiment is described by using an example in which the calling request message is forwarded by the SBC1.

After receiving the calling request message, the terminal device A returns a response message. A subsequent message distributing process is the same as that in the calling process initiated by terminal device A, and no detail is described herein again.

Further, if the SBC2 is faulty, it is required to forward the calling request message to a backup SBC with which the terminal device A is registered. If the backup device of the terminal device A is the SBC1, in step 604, the SBC1 processes the calling request message directly, and sends the calling request message to the softswitch. A subsequent execution process thereof is similar to that of the SBC2, and no detail is described herein again. If the backup device of the terminal device A is an SBC3, in step 604, the SBC1 forwards the calling request message to the SBC3 for processing. A subsequent execution process thereof is similar to that of the SBC2, and no detail is described herein again.

In the foregoing embodiment, when an SBC1 in the SBC pool receives a called request message of a terminal device, the SBC1 determines that the terminal device has been registered with an SBC2, and forwards the called request message to the SBC2, so that the SBC2 processes the called request message. In this way, all SBC devices in the SBC pool can be in a working state, and are mutually backed up for disaster recovery. In addition, a same IP address is configured for a terminal device side, a same IP address is also configured for a network side, and no special requirement is placed on an existing networking scheme and an existing routing device, so that implementation and popularization are easy.

Figure 10:
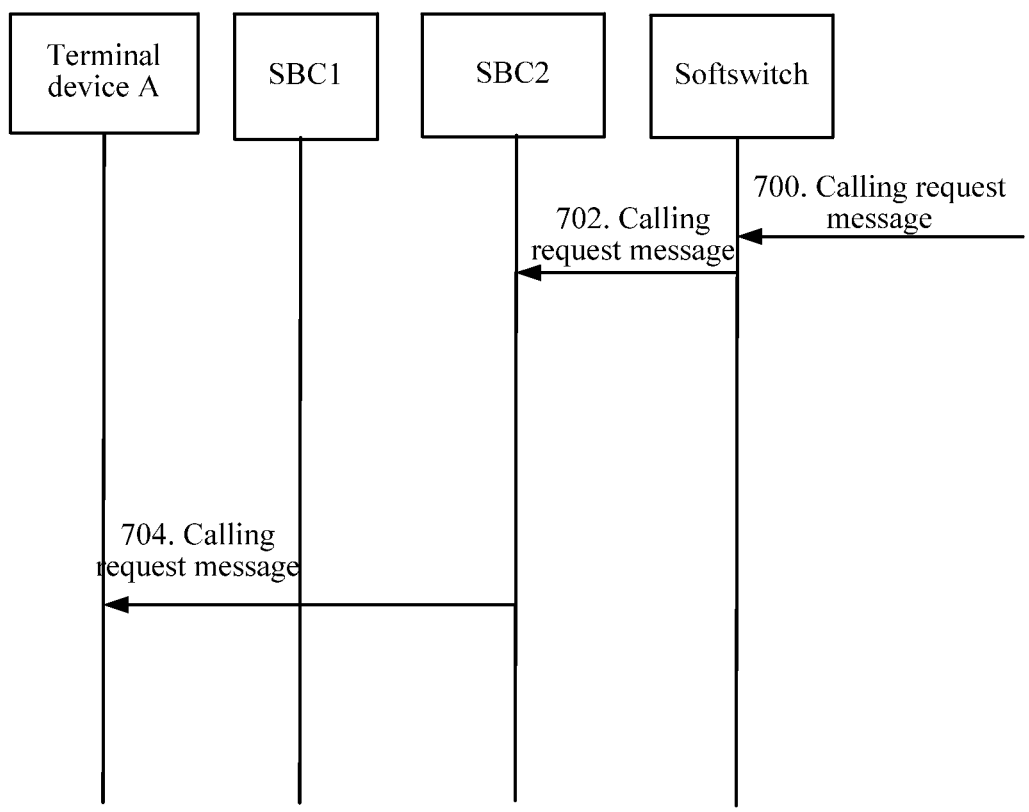
FIG. 10 is another flowchart of a specific implementation of a method for implementing a SBC pool according to an embodiment of the present invention.

Referring to FIG. 10, FIG. 10 is another flowchart of a specific implementation of a method for implementing a SBC pool according to an embodiment of the present invention. With reference to FIG. 4, this embodiment is described by using an example in which in Scenario 2, a terminal device is called and the terminal device is registered with an SBC2, including:

Step 700: Another user initiates a calling request message to a terminal device A, and a softswitch receives the calling request message.

Step 702: After receiving the calling request message, the softswitch delivers the calling request message of the terminal device A to an SBC pool, where a destination address of the calling request message is IP23. A routing device of a network-side IP bearer network routes the calling request message to the SBC2 directly.

Step 704: The SBC2 processes the calling request message, and sends the calling request message to the terminal device A.

This embodiment is described by using an example in which the SBC2 sends the calling request message to the terminal device A directly.

After receiving the calling request message, the terminal device A returns a response message. A subsequent message distributing process is the same as that in the calling process initiated by terminal device A, and no detail is described herein again.

Further, if the SBC2 is faulty, it is required to forward the calling request message to a backup SBC with which the terminal device A is registered. If the backup device of the terminal device A is an SBC1, in step 702, the destination address of the calling request message, which is delivered by the softswitch, of the terminal device A is IP22, and the SBC1 processes the calling request message directly, and sends the calling request message to the softswitch. A subsequent execution process thereof is similar to that of the SBC2, and no detail is described herein again. If the backup device of the terminal device A is an SBC3, in step 702, the destination address of the calling request message, which is delivered by the softswitch, of the terminal device A is IP24, and the SBC3 processes the calling request message directly. A subsequent execution process thereof is similar to that of the SBC2, and no detail is described herein again.

In the foregoing embodiment, when an SBC2 in the SBC pool receives a called request message of a terminal device, the SBC2 processes the called request message. In this way, all SBC devices in the SBC pool can be in a working state, and are mutually backed up for disaster recovery. In addition, a same IP address is configured for the terminal device, and no special requirement is placed on an existing networking scheme and an existing routing device, so that implementation and popularization are easy.

Figure 11:
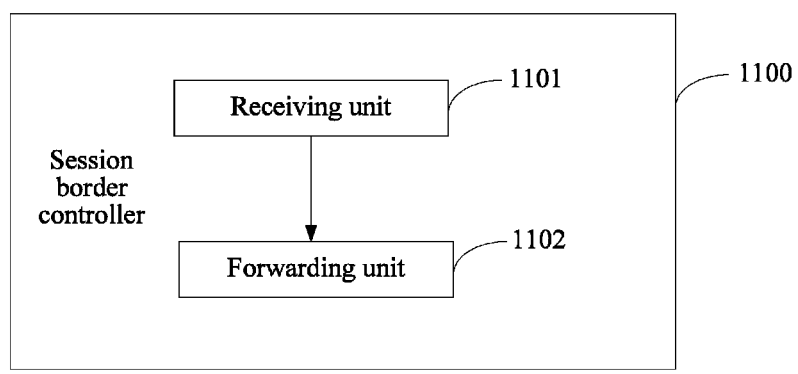
FIG. 11 is a schematic structural diagram of a SBC according to an embodiment of the present invention.

Referring to 11, FIG. 11 is a schematic structural diagram of a SBC 1100 according to an embodiment of the present invention. The SBC 1100 is located in a SBC pool, the SBC pool includes the SBC and one or more other SBCs, the SBC and the one or more other SBCs communicate with a terminal device by using a same IP address, and the SBC includes a receiving unit 1101 and a forwarding unit 1102, where the receiving unit 1101 is configured to receive a service message of the terminal device, and determine whether the terminal device is registered in the SBC pool; and the forwarding unit 1102 is configured to: when the receiving unit 1101 determines that the terminal device has been registered in the SBC pool, forward the service message to a SBC with which the terminal device is registered, so that the SBC with which the terminal device is registered processes the service message.

The service message of the terminal device may be a service message, such as a calling request message or a called request message, of the terminal device. SBC devices in the SBC pool may have different IP addresses in the SBC pool, where the IP addresses are used to distinguish different SBC devices in the SBC pool, so that the SBC devices in the SBC pool can be notified and managed.

The at least two SBCs may be disaster-recovery controllers for each other, where the disaster recovery for each other is that the at least two SBCs are mutually backed up for disaster recovery. Disaster-recovery SBC devices can ensure that a service of the terminal device is not interrupted when an SBC device is faulty. If an SBC device is faulty, another SBC device can replace the faulty SBC device to continue to process the service of the terminal device.

In the specific implementation manner of the SBC 1100 in the foregoing embodiment, it is avoided that disaster recovery of SBC devices places a special requirement for the terminal device, and the terminal device does not need to be configured with two IP addresses. In addition, all devices in the SBC pool can process the service message of the terminal device, thereby increasing a resource utilization rate.

Figure 12:
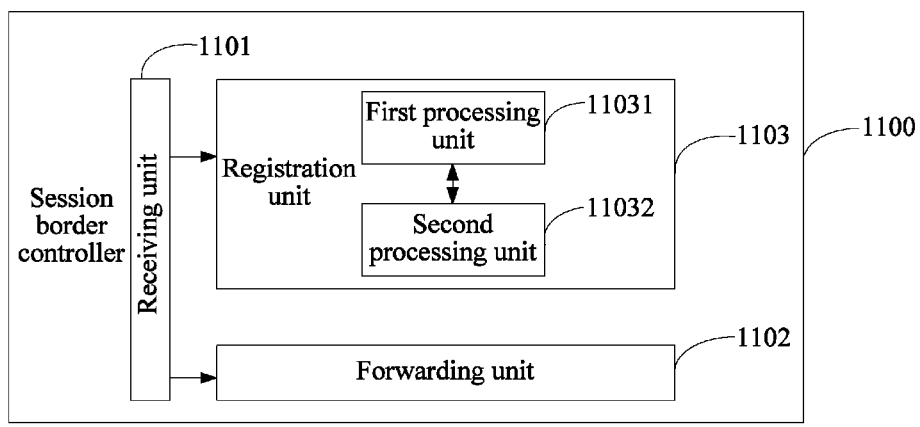
FIG. 12 is another schematic structural diagram of a SBC according to an embodiment of the present invention.

Optionally, the SBC 1100 may further include a registration unit 1103, as shown in FIG. 12, and the registration unit 1103 is configured to: when the terminal device is not registered in the SBC pool, distribute the service message to any one SBC in the SBC pool for registration.

Optionally, the registration unit 1103 may be further configured to send registration information of the terminal device to another SBC in the SBC pool, so that the another SBC records information of the SBC with which the terminal device is registered.

The registration unit 1103 registers the terminal device with any one SBC in the SBC pool, which can register an unregistered terminal device in the SBC pool, and implement disaster recovery backup between SBCs in the SBC pool, so that when a SBC is faulty, the terminal device may also be registered with another SBC. In addition, the registration unit 1103 sends the registration information of the terminal device to other SBC in the SBC pool, so that the other SBC in the SBC pool can know whether the terminal device is registered in the SBC pool and the SBC with which the terminal device is registered, and when receiving a service message, for example, a calling request message, of the terminal device, the other SBC in the SBC pool can forward the service message of the terminal device to the SBC with which the terminal device is registered for processing.

Optionally, the SBC 1100 and the one or more other SBCs communicate with a network-side device by using a same IP address; and the receiving unit is further configured to receive another service message of the network-side device about the terminal device, determine the SBC with which the terminal device is registered, and forward the another service message to the SBC with which the terminal device is registered, so that the SBC with which the terminal device is registered processes the another service message.

The network-side device may be a network control device or another device with a control function, for example, a control device such as a MGC or a softswitch.

The at least two SBCs communicate with the network-side device by using the same IP address, and no special requirement is placed on a network side, so that implementation manners of the SBCs in the SBC pool can be implemented more easily in an existing network, which can improve the network management quality and efficiency while reducing the maintenance cost.

Optionally, the determining, by the receiving unit 1101, whether the terminal device is registered in the SBC pool includes: querying a registration list stored by the SBC and determining whether the registration information of the terminal device is included in the registration list, and if the registration information of the terminal device is not included in the registration list, determining that the terminal device is not registered in the SBC pool, where the registration list records registration information, which is recorded by the SBC, of that the terminal device is registered in the SBC pool.

Optionally, the registration unit 1103 includes a first processing unit 11031 and a second processing unit 11032, as shown in FIG. 12, where the first processing unit 11031 is configured to: when the terminal device is not registered in the SBC pool, distribute the service message to any one SBC in the SBC pool for registration; and the second processing unit 11032 is configured to register the terminal device with another SBC in the SBC pool, where the another SBC is a backup device of the any one SBC, and when the any one SBC is faulty, the another SBC processes the service of the terminal device.

Optionally, the distributing, by the registration unit 1103, the service message to any one SBC in the SBC pool for registration includes: distributing, by the registration unit 1103 by means of round-robin, random selection, or load balancing, the service message to any one SBC in the SBC pool for registration; or distributing, by the registration unit 1103, the service message to a SBC whose physical address is closest to a physical address of the terminal device for registration.

The foregoing implementation manner can further ensure balancing of registration of the terminal device in the SBC pool, and ensure load balancing among devices in the SBC pool.

For the implementation manner of the SBC 1100, reference may be further made to the specific implementation manners of the SBC devices in the SBC pool in the foregoing method embodiments, and no detail is described herein again.

Persons of ordinary skill in the art may be aware that, in combination with the examples described in the embodiments disclosed in this specification, units and steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. Persons skilled in the art may use different methods to implement the described functions for each particular application, but it should not be considered that the implementation goes beyond the scope of the present invention.

It may be clearly understood by persons skilled in the art that, for the purpose of convenient and brief description, for a detailed working process of the foregoing apparatus and unit, reference may be made to a corresponding process in the foregoing method embodiments, and details are not described herein again.

In the several embodiments provided in the present application, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a universal serial bus (USB) flash drive, a removable hard disk, a read-only memory (ROM), a random access memory (RAM), a magnetic disk, or an optical disc.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions recorded in the foregoing embodiments or make equivalent replacements to some technical features thereof, as long as such modifications or replacements do not cause the essence of corresponding technical solutions to depart from the spirit and scope of the technical solutions of the embodiments of the present invention.

What is claimed is:

1. A method for implementing a session border controller pool, comprising:
receiving, by one of at least two session border controllers in the session border controller pool, a service message sent by a terminal device, wherein the session border controller pool comprises the at least two session border controllers, wherein each of the at least two session border controllers comprises a first Internet Protocol (IP) address for communicating with an access-side IP bearer network and a second IP address for communicating with a network-side IP bearer network, wherein the first IP address for all of the at least two session border controllers comprises a first same IP address, wherein the second IP address for all of the at least two session border controllers comprises a second same IP address, wherein the at least two session border controllers in the session border controller pool communicate with the terminal device using the first IP address for communicating with the access-side IP bearer network, and wherein the at least two session border controllers in the session border controller pool communicate with a network-side device using the second IP address for communicating with the network-side IP bearer network;
determining, by the one of the session border controllers receiving the service message, whether the terminal device is registered in the session border controller pool; and
distributing, by the one of the session border controllers receiving the service message, using load balancing, the service message to any one session border controller in the session border controller pool for registration when the terminal device is not registered in the session border controller pool.

2. The method for implementing the session border controller pool according to claim 1, wherein the method further comprises forwarding, by the one of the session border controllers receiving the service message, the service message to a session border controller with which the terminal device is registered to process the service message when the terminal device has been registered in the session border controller pool.

3. The method for implementing the session border controller pool according to claim 2, wherein the method further comprises sending, by the any one session border controllers, registration information of the terminal device to another session border controller in the session border controller pool after the terminal device is registered in the any session border controllers.

4. The method for implementing the session border controller pool according to claim 1, wherein the network-side device comprises a softswitch device.

5. The method for implementing the session border controller pool according to claim 1, wherein determining whether the terminal device is registered in the session border controller pool comprises:
querying a registration list;
determining whether the registration information of the terminal device is comprised in the registration list; and
determining, by the session border controller receiving the service message of the terminal device, that the terminal device is not registered in the session border controller pool when the registration information of the terminal device is not comprised in the registration list.

6. The method for implementing the session border controller pool according to claim 1, wherein after distributing, using load balancing, the service message to any one session border controller in the session border controller pool for registration, the method further comprises registering the terminal device with another session border controller when the any one session border controller is faulty, and wherein the another session border controller is a standby device of the any one session border controller.

7. A session border controller pool, comprising:
at least two session border controllers,
wherein each of the at least two session border controllers is a computing device executing software instructions stored on a non-transitory storage medium, and the session border controller pool is configured to:
receive, by one of the at least two session border controllers in the session border controller pool, a service message sent by a terminal device, wherein each of the at least two session border controllers comprises a first Internet Protocol (IP) address for communicating with an access-side IP bearer network and a second IP address for communicating with a network-side IP bearer network, wherein the first IP address for all of the at least two session border controllers comprises a first same IP address, wherein the second IP address for all of the at least two session border controllers comprises a second same IP address, wherein the at least two session border controllers in the session border controller pool communicate with the terminal device using the first IP address for communicating with the access-side IP bearer network, and wherein the at least two session border controllers in the session border controller pool communicate with a network-side device using the second IP address for communicating with the network-side IP bearer network;
determine, by the one of the session border controllers receiving the service message, whether the terminal device is registered in the session border controller pool; and
distribute, by the one of the session border controllers receiving the service message, using load balancing, the service message to any one session border controller in the session border controller pool for registration when the terminal device is not registered in the session border controller pool.

8. The session border controller pool according to claim 7, wherein the network-side device comprises a softswitch device.

9. A non-transitory computer readable medium having computer executable instructions stored thereon, the instructions when executed by at least two session border controllers in a session border controller pool, configure the session border controller pool to:

receive, by one of the at least two session border controllers in the session border controller pool, a service message sent by a terminal device, wherein the session border controller pool comprises the at least two session border controllers, wherein each of the at least two session border controllers comprises a first Internet Protocol (IP) address for communicating with an access-side IP bearer network and a second IP address for communicating with a network-side IP bearer network, wherein the first IP address for all of the at least two session border controllers comprises a first same IP address, wherein the second IP address for all of the at least two session border controllers comprises a second same IP address, wherein the at least two session border controllers in the session border controller pool communicate with the terminal device using the first IP address for communicating with the access-side IP bearer network, and wherein the at least two session border controllers in the session border controller pool communicate with a network-side device using the second IP address for communicating with the network-side IP bearer network;

determine, by the one of the session border controllers receiving the service message, whether the terminal device is registered in the session border controller pool; and distribute, by the one of the session border controllers receiving the service message, using load balancing, the service message to any one session border controller in the session border controller pool for registration when the terminal device is not registered in the session border controller pool.

10. The non-transitory computer readable medium according to claim 9, wherein the network-side device comprises a softswitch device.

* * * * *